(12) United States Patent
Launay et al.

(10) Patent No.: US 11,920,927 B2
(45) Date of Patent: Mar. 5, 2024

(54) POSITION ENCODER WITH COMBINED INDUCTIVE AND MAGNETIC SENSORS

(71) Applicant: Vishay MCB Industrie S.A.S., Château-Gontier (FR)

(72) Inventors: Maxime Launay, Renaze (FR); Pierre Karciauskas, Château Gontier (FR)

(73) Assignee: Vishay MCB Industrie S.A.S. (FR)

( * ) Notice: Subject to any disclaimer, the term of this patent is extended or adjusted under 35 U.S.C. 154(b) by 0 days.

(21) Appl. No.: 17/735,212

(22) Filed: May 3, 2022

(65) Prior Publication Data

US 2022/0349696 A1 Nov. 3, 2022

(30) Foreign Application Priority Data

May 3, 2021 (EP) ..................................... 21305571

(51) Int. Cl.
| | |
|---|---|
| *G01B 7/30* | (2006.01) |
| *G01D 5/14* | (2006.01) |
| *G01D 5/16* | (2006.01) |
| *G01D 5/20* | (2006.01) |

(52) U.S. Cl.
CPC ............... *G01B 7/30* (2013.01); *G01D 5/145* (2013.01); *G01D 5/16* (2013.01); *G01D 5/20* (2013.01)

(58) Field of Classification Search
CPC ...... G01D 5/12; G01D 5/14–145; G01D 5/16; G01D 5/20; G01D 5/244; G01D 5/245–2455; G01B 7/30
See application file for complete search history.

(56) References Cited

U.S. PATENT DOCUMENTS

| | | | |
|---|---|---|---|
| 4,786,891 A | 11/1988 | Ueda et al. | |
| 5,646,523 A | 7/1997 | Kaiser | |
| 6,111,402 A | 8/2000 | Fischer | |
| 6,567,033 B1* | 5/2003 | Astic ..................... | G01D 5/165 |
| | | | 702/94 |

(Continued)

FOREIGN PATENT DOCUMENTS

| | | |
|---|---|---|
| DE | 102011050834 A1 | 12/2012 |
| DE | 102019118397 A1 | 1/2021 |

(Continued)

OTHER PUBLICATIONS

European Search Report for EP 21 30 5571 dated Oct. 11, 2021.

*Primary Examiner* — Huy Q Phan
*Assistant Examiner* — David B Frederiksen
(74) *Attorney, Agent, or Firm* — Volpe Koenig

(57) ABSTRACT

A position encoder comprises: a first and second member, with the first member movable relative to the second member; a first sensor arranged at one of the first or second members, and a first track arranged at the other one of the first or second members such that the first sensor moves along the first track when the first member moves relative to the second member, with the first sensor capturing at least one of its position or displacement along the first track; a second sensor arranged at one of the first or second members, and a second track arranged at the other one of the first or second members such that the second sensor moves along the second track when the first member moves relative to the second member, with the second sensor capturing at least one of its position or displacement along the second track.

14 Claims, 2 Drawing Sheets

(56) References Cited

U.S. PATENT DOCUMENTS

| | | | |
|---|---|---|---|
| 7,573,259 B1* | 8/2009 | Kreger | G01D 5/145 |
| | | | 324/210 |
| 9,989,381 B2* | 6/2018 | Wolf | G01D 5/2452 |
| 2009/0102461 A1* | 4/2009 | Santos | G01D 5/145 |
| | | | 324/207.2 |
| 2014/0077795 A1 | 3/2014 | Oberhauser | |
| 2016/0363469 A1* | 12/2016 | Nishioka | G01D 5/24461 |
| 2020/0171958 A1 | 6/2020 | Huang | |
| 2021/0048315 A1 | 2/2021 | Meyer | |
| 2021/0116231 A1* | 4/2021 | Ausserlechner | G01D 5/145 |
| 2022/0003572 A1* | 1/2022 | Stewart | G01D 5/145 |

FOREIGN PATENT DOCUMENTS

| | | |
|---|---|---|
| EP | 0845659 A2 | 6/1998 |
| EP | 2711663 B1 | 11/2015 |
| EP | 3702738 A1 | 9/2020 |

\* cited by examiner

POSITION ENCODER WITH COMBINED INDUCTIVE AND MAGNETIC SENSORS

CROSS-REFERENCE TO RELATED APPLICATION

This application claims the benefit of European Patent Application No. 21305571.8, filed on May 3, 2021, which is incorporated herein by reference as if fully set forth.

FIELD OF INVENTION

The invention relates to a position encoder, in particular to a rotary encoder, for determining the relative position of two parts movable relative to each other, wherein the position encoder comprises a first member attachable to one of the parts and a second member attachable to the other, with the first member being movable relative to the second member, and wherein the position encoder further comprises means for capturing the position of the first member relative to the second member.

BACKGROUND

An example of such a position encoder is a rotary encoder for measuring angle-related values, such as an angular position of a rotatable shaft relative to one or more stationary parts. Another example of a position encoder is a linear encoder for measuring linear displacements of two parts relative to each other.

To measure the position of the first member relative to the second member of a position encoder, one of them may be provided with a sensor and the other one with a reference track including some kind of scale which extends along the track and can be scanned by the sensor, wherein the track is positioned such that the sensor reads or interacts with different points or regions of the scale in dependence on its position relative to the track. The points or regions of the scale may differ along the scale such that a signal obtained by the sensor from a respective point or region of the scale is indicative of the position of the sensor along the track and, hence, of the position of the first member relative to the second member.

If the signal obtained by the sensor from a point or region of the track is unique, an absolute position can be derived therefrom, i.e. the signal can unambiguously be attributed to a single position of the sensor relative to the entire track and, hence, to a single position of the first member relative to the second member of the position encoder. However, the scale may also be such that a signal is only unique within a respective section of the scale. For example, the scale may consist of a series of identical patterns. The reason for repeating the pattern along the scale may be that the encoding of the scale cannot provide enough discernable states to cover the entire track with the desired resolution.

If the scale includes repetitive patterns, only an incremental position can be derived from the signal, i.e. the signal is indicative of a position within a respective section of the track, but is ambiguous as to which section it is. Such incremental position measurements can nevertheless be useful, since they may provide higher resolution than absolute position measurements using the same measuring technique. Therefore, incremental position measurements can in particular be useful if only the displacement, but not the absolute position, of the first member relative to the second member is of interest. Also, combining an absolute position measurement with an incremental position measurement can be used to increase the overall resolution compared to a mere absolute position measurement. The relatively coarse result of the absolute position measurement can then be used to identify the respective section of the track within which the overall absolute position can be determined with high resolution from the relatively precise result of the incremental position measurement relating to this section.

The sensor may, in general, be an optical sensor and the track may include a visual encoding pattern as scale, for example. However, optical measurements are susceptible to being affected by dirt. Therefore, depending on the environment, other measurement techniques, such as measurements based on inductive or magnetic sensing, can be preferred.

The use of inductive measurement techniques allows the production of high-performance sensors at rather low cost. However, such sensors, which can be made on printed circuit boards (PCB), require rather large surfaces as objects to be sensed by the sensor. Another shortcoming of inductive measurement techniques is their limited resolution. This is because the resolution is dependent on the pitch of the receiver coils (sensing windings), and for high resolutions the receiver coils need to be drawn with a very small pitch which is limited by the fineness of the engraving or etching of the PCB.

Higher resolutions may be obtained by magnetic measurement techniques. Using a multi-pole magnetic element as scale on the reference track allows rather high resolutions while requiring relatively little space. However, with such a setup alone only incremental positional data can be obtained. In order to obtain absolute positions with high resolution based on magnetic sensing, the high-resolution incremental position measurement based on the multi-polar track can be complemented by a coarse absolute position measurement which uses a unipolar track having only a single pair of opposite magnetic poles. In case of a rotary encoder the unipolar track could be provided in form of a magnetic disk having only two opposite magnetic poles, but such magnetic disk is rather difficult to produce and therefore expensive. In addition, if the multi-polar track and the unipolar track are positioned in close proximity to each other in order to save space, the magnetic field of the one may interfere with the sensing of the other, and vice-versa.

It is an objective of the present invention to provide a position encoder, in particular a rotary encoder, which allows measuring an absolute position with high resolution and high reliability while requiring little space.

SUMMARY

The object of the invention is achieved by a position encoder according to the present disclosure.

Advantageous embodiments of the invention result from the present description and the Figures.

The position encoder according to the invention comprises a first member and a second member, with the first member being movable relative to the second member. Even though it is not necessary that one of the first and second members is stationary, depending on the application it may be expedient if either the first or the second member is stationary. That the first member is movable relative to the second member does not necessarily mean that the first member cannot be stationary. Since a movement of the second member relative to the first element always corresponds to a movement of the first member relative to the second member, even a stationary first member is movable relative to the second member as long as the second member is not stationary as well.

To measure the relative position of two parts movable relative to one another, the first member and the second member of the position encoder may be attached to the parts such that the first member moves with one of the parts and the second member moves with the other. The first member and/or the second member may in particular be specifically adapted for easy attachment to a respective part.

The movability of the first member relative to the second member may be a result of the movability of the respective parts and, hence, correspond to their movability. But the first member and the second member of the position encoder may also be, directly or indirectly, movably linked to, or supported at, each other so that their movability is defined by the kind of linkage or support.

The relative movability of the first member and the second member is preferably limited to a single degree of freedom. The single degree of freedom may correspond to a translation along a straight line or to a rotation around an axis, for example. However, in general, the movability may also be restricted to a certain non-linear path in three-dimensional space along which the one member can move relative to the other.

The position encoder according to the invention further comprises a first sensor arranged at one of the first and second members, and a first track arranged at the other one of the first and second members such that the first sensor moves along the first track when the first member moves—constrained to its movability—relative to the second member. Preferably, the first sensor is arranged at one of the first and second members which is stationary. The first sensor is configured to capture its own position and/or displacement along the first track. In other words, the first sensor is capable of sensing, based on a certain measurement principle, a characteristic of the first track which changes along the first track so that the first sensor can output a signal based on the sensed characteristic which is indicative of the position and/or displacement of the first sensor along the first track. Depending in particular on the kind of track, the captured position may in general be either an absolute position unique along the total range of the first track or an incremental position within an (ambiguous) respective section of the first track.

Similarly, the position encoder according to the invention further comprises a second sensor arranged at one of the first and second members, and a second track arranged at the other one of the first and second members such that the second sensor moves along the second track when the first member moves—constrained to its movability—relative to the second member. Preferably, the second sensor is arranged at the same one of the first and second members as the first sensor. However, the second sensor may also be arranged at the other member. Preferably, the second sensor is arranged at one of the first and second members which is stationary. The second sensor is configured to capture its own position and/or displacement along the second track. In other words, the second sensor is capable of sensing, based on a certain measurement principle, a characteristic of the second track which changes along the second track so that the second sensor can output a signal based on the sensed characteristic which is indicative of the position and/or displacement of the second sensor along the second track. Depending in particular on the kind of track, the captured position may in general be either an absolute position unique along the total range of the second track or an incremental position within an (ambiguous) respective section of the second track.

Naturally the first and second sensors each have a certain extension along the first or second track, respectively. Especially if the track extends along a closed path, the sensor (for example an inductive sensor having exciting and/or sensing windings as explained further below) may even extend over the entire length of the track. Hence, the said positions of the first and second sensors relative to the first or second track, respectively, are each defined with respect to a defined reference point of the respective sensor. This reference point may be defined as a center or an outer edge of the sensor, for example, but may in general be any defined point on the sensor. The position of the sensor along the respective track may then correspond to the (signed) distance between the reference point of the sensor and a zero position on the track which, in particular, may be defined by one of the ends of the track. However, any other point along the track may be defined as the zero position, especially if the track has no ends because it is closed. In case of a circular track the distance may also be measured as a (signed) angular distance.

According to the invention, the first sensor is an inductive sensor and the first track includes alternating conductive and non-conductive sections distributed along the first track. Particularly, the conductive and non-conductive sections may be distributed along the first track in a regular pattern. In this context, conductivity relates to electrical conductivity which allows inducing electrical currents by applying a magnetic field. The first track includes at least one conductive section and at least one non-conductive section. If the first track has more than just one conductive or non-conductive section, the conductive sections alternate with the non-conductive sections, i.e. sections adjacent to a conductive section are non-conductive and sections adjacent to a non-conductive section are conductive. The first sensor may then be configured to inductively capture its position and/or displacement in relation to this pattern of alternating conductive and non-conductive sections. If the pattern is repetitive so that it includes multiple sections that cannot be distinguished from each other by the sensor, only an incremental position may be obtainable.

In contrast to the first sensor and the first track, the second sensor is a magnetic sensor and the second track includes a plurality of magnetic poles distributed along the second track with alternating magnetic polarity. Particularly, the plurality of magnetic poles may be distributed along the second track in a regular pattern. Similar to above, the second track includes at least one magnetic pole of either polarity. If the second track includes only a single pair of opposite magnetic poles, the second sensor may in general be configured to magnetically capture its absolute position relative to the second track. However, preferably, the second track includes much more magnetic poles, in particular at least 32, for example 64 or even more, magnetic poles in total. In this case, only an incremental position may be obtainable.

In the position encoder according to the invention not only an absolute position measurement and an incremental position measurement can be combined to increase the overall resolution, but also inductive and magnetic measurement techniques are combined so as to obtain by this combination a position encoder which is both highly reliable and requires comparatively little space. The limited resolution of inductive sensing can be compensated by the additional magnetic sensing so that very high resolution can be achieved; and providing a unipolar track by means of a difficult to produce magnetic disk can be avoided by complementing the magnetic sensing with the inductive sensing. It has been found that the magnetic sensing (plurality of magnetic poles distributed along the second track) does not impair the inductive sensing even though the first sensor has to rely on magnetic fields. Instead, pairing inductive and magnetic sensing has the advantage that their effects can be distinguished rather clearly so that mutual interference can be excluded or at least minimized.

According to an advantageous embodiment, the position encoder comprises an evaluation unit which receives the position and/or displacement captured by the first sensor and the position and/or displacement captured by the second sensor and determines therefrom an output value indicating the absolute position of the first member relative to the second member. The output value may, for example, be determined by entering the captured data into a calculation and/or by looking-up predetermined values form a look-up table stored within, or accessible by, the evaluation unit.

However, an evaluation unit does not necessarily need to be part of the position encoder. Alternatively, the position encoder may just output the position and/or displacement captured by the first sensor and the position and/or displacement captured by the second sensor, for example to an external evaluation unit. These data may be output separately or combined either as unprocessed raw data or in a pre-processed form.

According to a further embodiment, the first member is rotatable relative to the second member and the first and second tracks extend along concentric circular paths. In such an embodiment, the position encoder corresponds to a rotary encoder. The movability of the first member relative to the second member may in particular be restricted to a rotation relative to the second member about a defined axis with the circular paths along which the first and second tracks extend being concentric with respect to this axis. If the tracks are circular, the position of a sensor along the respective track may be defined as an angular position of a reference point of the sensor relative to a zero position on the track with respect to the axis of rotation.

In such an embodiment, it is advantageous if one of the first and second tracks is arranged radially, in particular with respect to the said axis, inside the other. By arranging both tracks in a same plane perpendicular to the said axis, minimal axial space is required. Preferably, a track which serves to capture an absolute position is arranged radially inside the other track so that the outer and, hence, longer track can accommodate a large number of poles for high-resolution incremental position measurements. In particular, it is preferred that the first track is arranged radially inside the second track.

According to an embodiment, the first sensor and the first track are configured such that an output of the first sensor is indicative of an absolute position of the first sensor along the first track. This output then is at the same time also indicative of the absolute position of the first member relative to the second member.

In particular, the first track may be limited to be a unipolar track by including a single conductive section and a single non-conductive section. As a result, the conductive and non-conductive sections of the first track can be rather large and, as a consequence, coils of the inductive first sensor advantageously do not need to have extremely small pitches. If the first track is circular as explained above, the conductive and the non-conductive sections preferably both extend over 180°. However, the two sections do not necessarily need to have the same (angular) extension.

If the first sensor and the first track are configured such that the first sensor outputs an absolute position, the second sensor and the second track are preferably configured such that the second sensor outputs an incremental position to be combined with the absolute position so as to increase the overall resolution of the position measurement.

According to a further embodiment, the first sensor is configured to generate a magnetic field which induces eddy currents in the conductive sections of the first track and to measure the effect of the opposing magnetic field which is generated by the eddy currents in dependence on the position of the conductive sections relative to the first sensor. For generating the magnetic field, the first sensor may comprise primary or exciting windings. For measuring the effect of the opposing magnetic field, the first sensor may comprise secondary or sensing windings.

According to a preferred embodiment, the first sensor comprises four sensing windings each of which has a waveform the period of which corresponds to the length of the first track, wherein the waveforms of the four sensing windings are phase-shifted by a quarter period with respect to each other. In general, the waveforms may also have smaller periods. However, a single period along the length of the first track can be sufficient to reliably determine to the (absolute) position of the sensor relative to the track. The waveform is preferably sinusoidal and may in particular have an exact sinus form or at least be based upon an exact sinus form. If the first track does not extend along a straight path, the actual form of the sensing windings may be result of bending the basic waveform along the course of the first track.

Since the waveforms of the four sensing windings are phase-shifted by a quarter period (90°) with respect to each other, they form two pairs each of which comprises two waveforms in antiphase, wherein the two pairs are phase-shifted by a quarter period with respect to one another. Thus, one of these pairs can provide a "sine" signal and the other one a "cosine" signal relating to the position of one or more conductive sections of the first track relative to the sensing windings of the first sensor. Together the "sine" signal and the "cosine" signal allow an unambiguous distinction of different positions along one period of the waveform.

According to an advantageous embodiment, the first track includes exactly one conductive section which extends over half the length of the first track and/or exactly one non-conductive section which extends over half the length of the first track. If the first track extends along a straight line, the conductive section may extend from one end of the track to the center of the track, while the non-conductive section extends from the center of the track to the other end of the track. Alternatively, one conductive or non-conductive section may be sandwiched between two non-conductive or conductive sections, respectively. If the first track extends along a closed path, the first track preferably included exactly one conductive section and exactly one non-conductive section which extend over separate halves of the track. Particularly in a circular first track, the conductive section and the non-conductive section may each extend over 180°.

According to a further embodiment, the position encoder comprises a third sensor arranged at one of the first and second members, and a third track arranged at the other one of the first and second members such that the third sensor moves along the third track when the first member moves—constrained to its movability—relative to the second member, with the third sensor being configured to capture its position and/or displacement along the third track. Preferably, the third sensor is arranged at the same one of the first and second members as the first sensor which is preferentially stationary. The position captured by the third sensor can be an absolute position or an incremental position. Hence, the position may refer to a unique position along the entire range of movability of the third sensor along the third track (corresponding to the range of movability of the first member relative to the second member) or to a position which is unique only with respect to a respective section of this range. Such an embodiment allows supplementing the position determination by a third independent measurement and, hence, to increase the overall resolution.

In particular, in such an embodiment, it is preferred that the third sensor is an inductive sensor and the third track includes alternating conductive and non-conductive sections distributed along the third track, wherein the number of conductive sections of the third track is different from the number of conductive sections of the first track (and/or the number of non-conductive sections of the third track is different from the number of non-conductive sections of the first track). Particularly, the conductive sections of the third track may be distributed along the third track in a regular pattern. In this manner, the third sensor and third track may supplement the inductive position measurement of the first sensor and first track.

In particular, the number of conductive sections of the first track and the number of conductive sections of the third track may be relatively prime (and/or the number of non-conductive sections of the first track and the number of non-conductive sections of the third track may be relatively prime) so that the combination of signals obtained from the first and third sensors is unique for each position of the first member relative to the second member even if both numbers are greater than one. In this manner, an absolute position can be obtained from the first and third sensors in combination. Preferably, the number of conductive sections of the first track and the number of conductive sections of the third track differ by one (and/or the number of non-conductive sections of the first track and the number of non-conductive sections of the third track differ by one). For example, the first track may include five conductive sections (and/or five non-conductive sections) and the third track may include six conductive sections (and/or six non-conductive sections).

If the position encoder comprises an evaluation unit as described above, this unit preferably receives also the position and/or displacement captured by the third sensor and takes it additionally into account in determining the output value. Furthermore, similar to the first and second tracks, if the first member is rotatable relative to the second member, the third track may extend along a circular path concentric to the circular path along which the first and second tracks may extend. Apart from this, the third sensor and the third track may be formed in a manner corresponding to one or more of the manners described above for the first sensor and the first track.

According to a further embodiment, the second sensor is one of a Hall-effect sensor, a sensor based on anisotropic magnetoresistance (AMR), or a sensor based on tunnel magnetoresistance (TMR). Such sensors allow determining the relative position of a magnetic pole pair within a short range with relatively high precision.

According to a preferred embodiment, the second sensor and the second track are configured such that an output of the second sensor is indicative of an incremental position of the second sensor along the second track. This output then is at the same time also indicative of an incremental position of the first member relative to the second member.

An incremental position captured by the second sensor may in particular be a position relative to the pair of opposite magnetic poles of the second track which is (currently) closest to the second sensor. The incremental position obtained from the second sensor may then be applied to an absolute position obtained from the first sensor (or from the first and third sensors in combination, if present) to yield an absolute position with increased resolution.

To capture small incremental positions (in order to obtain a high overall resolution), the second track may include a large number of magnetic poles. In particular, the second track may include at least 16, preferably at least 32, magnetic poles. The maximum number of magnetic poles in the second track is, however, limited by their resulting (minimum) size along the second track and by the resolution of the first sensor, since it is necessary to identify a single pair of magnetic poles by the coarse absolute position measured by the first sensor.

By using a position encoder according to the invention high resolutions may be achieved while requiring relatively little space. For example, a rotary encoder according to the invention may provide resolutions of 20 bits or more, with the first member and the second member (and, hence, the sensor tracks) of the encoder having diameters of less than 40 mm.

BRIEF DESCRIPTION OF THE DRAWINGS

In the following, an exemplary embodiment of a position encoder according to the invention is described with reference to the drawings in which.

DETAILED DESCRIPTION

Figure 1:
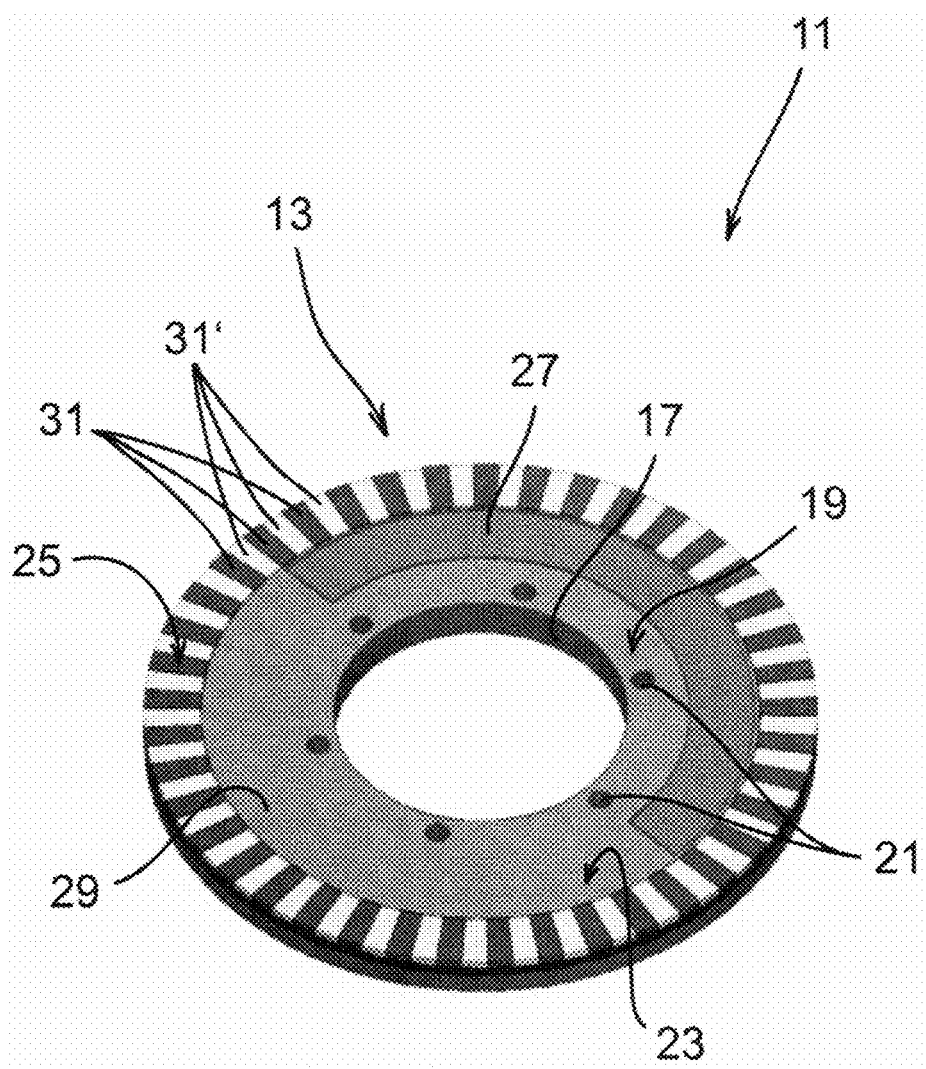
FIG. 1 shows the first member of the position encoder according to the exemplary embodiment.
Figure 2:
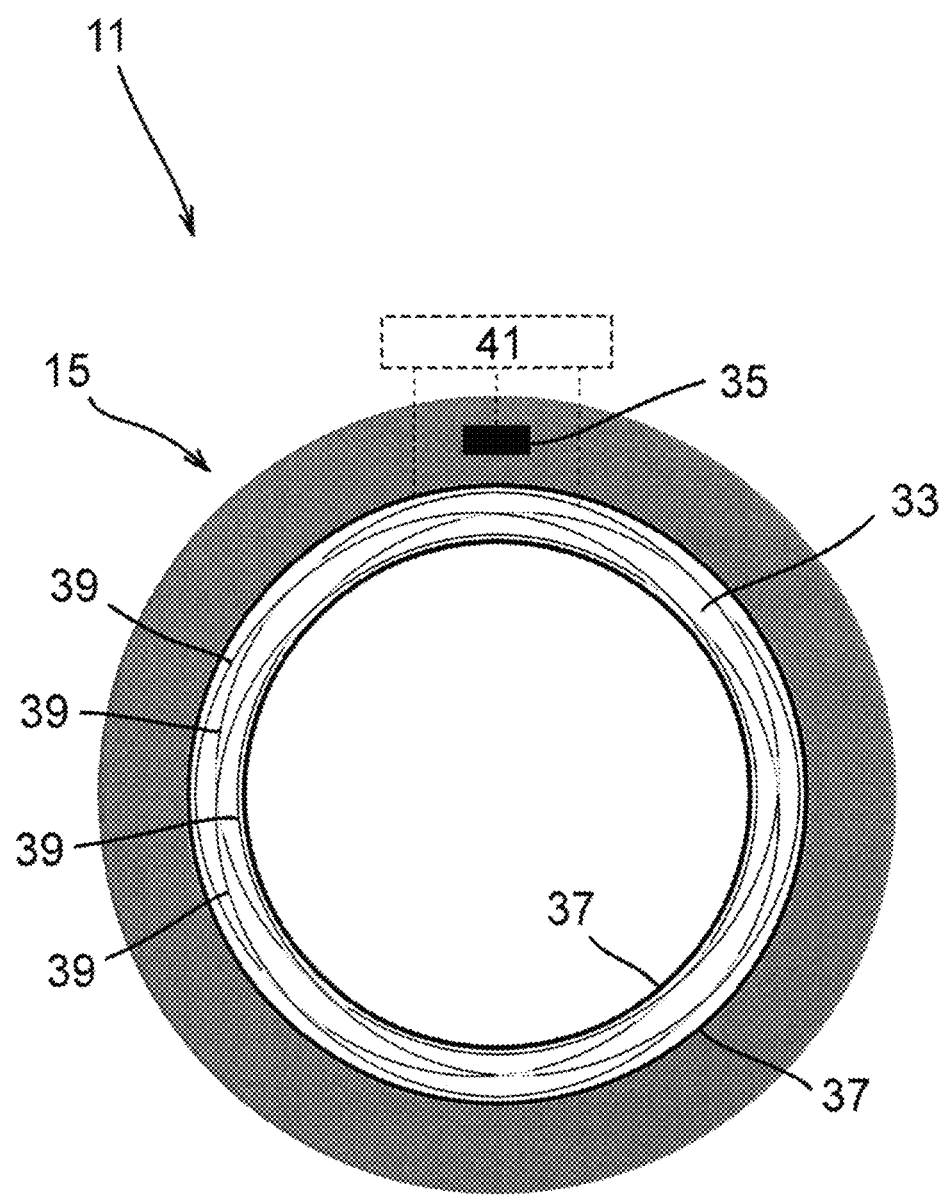
FIG. 2 shows the second member of the position encoder according to the exemplary embodiment.

The Figures show an exemplary embodiment of a position encoder 11 according to the invention. The position encoder 11 is configured as a rotary encoder and comprises a first member 13 and a second member 15 both of which are formed as flat circular disks and have the same outer diameter. Of the position encoder 11 only the first member 13 and parts arranged thereon are shown in FIG. 1, while only the second member 15 and parts arranged thereon are shown in FIG. 2. It is to be noted that the Figures are schematic and dimensions are not necessarily to scale.

The first member 13 is configured for attachment to a rotating part such as a shaft (not shown). To this end, the first member 13 has a central through hole 17 which gives the first member 13 a ring form, and a flange section 19 which surrounds the trough hole 17 and contains boreholes 21 for screw fitting the first member 13 to the respective part. The second member 15, on the contrary, is configured to be stationary. Hence, the first member 13, by being attached to a rotating part, is supported rotatably relative to the second member 15 of the position encoder 11. When installed, the first member 13 and the second member 15 are positioned such that they are aligned in parallel and coaxial to each other with only a small gap between their surfaces facing upwards in the Figures.

Between the outer circumference and the flange section 19 of the first member 13 a first track 23 and a second track 25 are arranged at the first member 13. The first track 23 and the second track 25 are both circular, i.e. they extend along circular paths, and concentric to each other and to the first member 13 with respect to an axis which coincides with the axis of rotation of the first member 13. The first track 23 and the second track 25 are arranged radially adjacent to each other, with the first track 23 being arranged radially inside the second track 25.

The first track 23 includes a conductive section 27 which extends over 180°, and a non-conductive section 29 which extends over the remaining 180° of the circular first track 23. The conductive section 27 is formed, for example, from a copper plate or foil supported by the first member 23 which itself is non-conductive, whereas the non-conductive section 29 is simply blank.

The second track 25 includes a plurality of magnetic poles 31, 31' regularly distributed along the second track 25 with alternating polarity.

The second member 15 is designed as a multilayer printed circuit board (PCB) having disk shape the outer diameter of which corresponds to the outer diameter of the first member 13. Within an inner radial section of the second member 15 which corresponds to the first track 23 on the first member 13 a first sensor 33 is arranged at the second member 15, whereas within an outer radial section of the second member 15 which corresponds to the second track 25 on the first member 13 a second sensor 35 is arranged at the second member 15.

The first sensor 33 is an inductive sensor and comprises exciting windings 37 and sensing windings 39 which are formed as PCB circuit traces on the second member 15.

The exciting windings 37 are arranged along two circles radially bordering the first sensor 33. The exciting windings 37 act as transmitter coils and are driven by an alternating current to generate an alternating magnetic field which is, within the circular area between the inner and outer exciting windings 37, oriented perpendicular to the planar disk shape of the second member 15.

The sensing windings 39 are arranged within the said circular area between the inner and outer exciting windings 37.

In particular, the first sensor 33 comprises exactly four sensing windings 39. Each of them has a sinusoidal waveform which is the result of bending a single period of a sine-wave along a circle. The waveform thus corresponds to a circle the radius of which varies harmonically. As can be seen in FIG. 2, the waveforms of the four sensing windings 39 have the same mean radius, which corresponds at least essentially to the average of the radii of the inner and outer exciting windings 37, but are phase-shifted by a quarter period with respect to each other such that the points where the radius is largest for a respective one of the four exciting windings 37 are 90° apart, facing upwards, to the right, downwards and to the left in FIG. 2, respectively. The sensing windings 39 are at least partly arranged in different layers of the PCB to allow the sensing windings 39 to cross without contact (cf. dotted lines).

It is to be noted, though, that in FIG. 2 the design of the first sensor 33 and especially of its exciting and sensing windings 37, 39 is purely schematic and shown in a simplified manner. In particular, some interconnections and input or output connections, such as connections to a voltage source, for example, are not shown.

Due to the small distance between the first member 13 and the second member 15 of the position encoder 11 when installed, the alternating magnetic field generated by the exciting windings 37 is perpendicular not only to the ring plane of the sensing windings 39, but essentially also to the first track 23 on the first member 13. As a consequence, the magnetic field induces eddy currents in the conductive section 27 of the first track 23. These eddy currents, in turn, generate an opposing magnetic field essentially perpendicular to the ring plane of the sensing windings 39 and superimposing the original magnetic field within an angular range defined by the angular extension of the conductive section 27. The sensing windings 39 then act as receiver coils in which currents are induced in dependence on the superimposed magnetic fields and, hence, in dependence on the angular position of the conductive section 27 of the first track 23 relative to the sensing windings 39 of the first sensor 33. Due to the said phase-shift these currents are different for the four sensing windings 39. Combining the signals obtained from a pair of two sensing windings 39 which are in antiphase eliminates baselines, and combining the signals of the two such pairs which are phase-shifted by 90° allows unambiguously determining the angular position of the conductive section 27 relative to the sensing windings 39 and, hence, the absolute angular position of the first member 13 relative to the second member 15.

A corresponding signal processing for deriving the angular position from the raw signals is done by means of an evaluation unit 41 which is connected to the first sensor 33 and will be explained in more detail later.

The second sensor 35 is a magnetic sensor, in particular a Hall-effect sensor, an AMR sensor or a TMR sensor. Alternatively, the second sensor 35 could be a different type of magnetic sensor allowing to capture the position of the second sensor 35 relative to a respective pair of opposite magnetic poles 31, 31' of the second track 25.

While the first sensor 33 extends circumferentially along the entire radial section corresponding to the first track 23, the second sensor 35 has a rather small circumferential extension. Nevertheless, both sensors 33, 35 move along their respective track 23, 25 when the first member 13 is rotated relative to the second member 15. In particular, the second sensor 35 moves along the magnetic poles 31, 31' of the second track 25. In doing so, the magnetic field of the magnetic poles 31, 31' captured by the second sensor 35 periodically varies. The corresponding signal output by the second sensor 35 is therefore indicative of the incremental position of the second sensor 35 within the angular section corresponding to the pair of opposite magnetic poles 31, 31' which is closest to the second sensor 35. This pair can be determined from the comparatively coarse absolute position obtained from the first sensor 33 so that in combination a high-resolution absolute position may be derived. To this end, the second sensor 35 is connected to the same evaluation unit 41 as the first sensor 33.

In FIG. 2 the evaluation unit 41 is shown merely schematically. The evaluation unit 41 receives from the first sensor 33 one or more signals indicative of a coarse absolute position of the first member 13 relative to the second member 15 and from the second sensor 35 one or more signals indicative of an incremental position of the first member 13 relative to the second member 15 and determines therefrom an output value indicating the high-resolution absolute position of the first member 13 relative to the second member 15.

The evaluation unit 41 may be arranged at the second member 15, where it may be necessary to shield it from the first and second sensors 33, 35 and/or to shield the sensors 33, 35 from the evaluation unit 41. Alternatively, the evaluation unit 41 may be separate from the second member 15 and connected to the first and second sensors 33, 35 across the distance. The evaluation unit 41 may be a combined control and evaluation unit which is configured not only to evaluate signals obtained from the first and second sensors 33, 35, but also to control these sensors 33, 35. In particular, the evaluation unit 41 may also serve as a voltage source for the exciting windings 37 of the first sensor 33 and/or for the second sensor 35.

REFERENCE SIGNS

11 position encoder
13 first member
15 second member
17 through hole
19 flange section
21 borehole
23 first track
25 second track
27 conductive section
29 non-conductive section
31, 31' magnetic pole
33 first sensor
35 second sensor
37 exciting windings
39 sensing windings
41 evaluation unit

The invention claimed is:

1. A position encoder, comprising:
a first member and a second member, with the first member being movable relative to the second member;
a first sensor arranged at one of the first or second members, and a first track arranged at the other one of the first or second members such that the first sensor moves along the first track when the first member moves relative to the second member, with the first sensor being configured to capture at least one of its position or displacement along the first track;
a second sensor arranged at one of the first or second members, and a second track arranged at the other one of the first or second members such that the second sensor moves along the second track when the first member moves relative to the second member, with the second sensor being configured to capture at least one of its position or displacement along the second track;
wherein the first sensor is an inductive sensor and the first track includes alternating conductive and non-conductive sections distributed along the first track, and
wherein the second sensor is a magnetic sensor and the second track includes a plurality of magnetic poles distributed along the second track with alternating magnetic polarity.

2. The position encoder according to claim 1, wherein the position encoder comprises an evaluation unit which receives at least one of the position or displacement captured by the first sensor and the at least one of the position or displacement captured by the second sensor, and determines therefrom an output value indicating an absolute position of the first member relative to the second member.

3. The position encoder according to claim 1, wherein the first member is rotatable relative to the second member and the first and second tracks extend along concentric circular paths.

4. The position encoder according to claim 3, wherein the first track is arranged radially inside the second track.

5. The position encoder according to claim 1, wherein the first sensor and the first track are configured such that an output of the first sensor is indicative of an absolute position of the first sensor along the first track.

6. The position encoder according to claim 1, wherein the first sensor is configured to generate a magnetic field which induces eddy currents in the conductive sections of the first track and to measure an effect of an opposing magnetic field which is generated by the eddy currents based on the position of the conductive sections relative to the first sensor.

7. The position encoder according to claim 1, wherein the first sensor comprises four sensing windings each of which has a waveform with a period which corresponds to a length of the first track, wherein the waveforms of the four sensing windings are phase-shifted by a quarter period with respect to each other.

8. The position encoder according to claim 1, wherein the first track includes at least one of: (i) exactly one conductive section which extends over half of a length of the first track, or (ii) exactly one non-conductive section which extends over half of the length of the first track.

9. The position encoder according to claim 1, wherein the position encoder comprises a third sensor arranged at one of the first or second members, and a third track arranged at the other one of the first or second members such that the third sensor moves along the third track when the first member moves relative to the second member, with the third sensor being configured to capture at least one of its position or displacement along the third track,
wherein the third sensor is an inductive sensor and the third track includes alternating conductive and non-conductive sections distributed along the third track, and
wherein a number of conductive sections of the first track and a number of conductive sections of the third track differ by one.

10. The position encoder according to claim 1, wherein the second sensor is a Hall-effect sensor, a sensor based on anisotropic magnetoresistance (AMR), or a sensor based on tunnel magnetoresistance (TMR).

11. The position encoder according to claim 1, wherein the second sensor and the second track are configured such that an output of the second sensor is indicative of an incremental position of the second sensor along the second track.

12. The position encoder according to claim 1, wherein the second track includes at least 16 magnetic poles.

13. The position encoder according to claim 1, wherein the second track includes at least 32 magnetic poles.

14. The position encoder according to claim 7, wherein the waveform is approximately sinusoidal.

* * * * *